United States Patent
Krishnan et al.

(10) Patent No.: US 8,948,361 B2
(45) Date of Patent: Feb. 3, 2015

(54) MITIGATING SPAM AND IDENTIFYING CALLERS IN VIDEO CALLS

(75) Inventors: Parameshwaran Krishnan, Basking Ridge, NJ (US); Navjot Singh, Denville, NJ (US)

(73) Assignee: Avaya Inc., Basking Ridge, NJ (US)

( * ) Notice: Subject to any disclaimer, the term of this patent is extended or adjusted under 35 U.S.C. 154(b) by 202 days.

(21) Appl. No.: 13/541,159

(22) Filed: Jul. 3, 2012

(65) Prior Publication Data

US 2014/0009560 A1    Jan. 9, 2014

(51) Int. Cl.
H04M 1/56    (2006.01)

(52) U.S. Cl.
USPC .................................. 379/201.1; 379/142.05

(58) Field of Classification Search
USPC ......................... 348/14.01; 379/142.05, 201.1
See application file for complete search history.

(56) References Cited

U.S. PATENT DOCUMENTS

| | | | | |
|---|---|---|---|---|
| 5,651,053 | A * | 7/1997 | Mitchell | 379/210.02 |
| 6,385,303 | B1 * | 5/2002 | Peterson et al. | 379/67.1 |
| 6,498,841 | B2 * | 12/2002 | Bull et al. | 379/142.08 |
| 6,724,872 | B1 * | 4/2004 | Moore et al. | 379/215.01 |
| 6,735,295 | B1 * | 5/2004 | Brennan et al. | 379/215.01 |
| 7,136,458 | B1 * | 11/2006 | Zellner et al. | 379/88.02 |
| 7,174,163 | B2 * | 2/2007 | Aksu et al. | 455/414.1 |
| 7,499,528 | B2 * | 3/2009 | Lee et al. | 379/88.19 |
| 8,406,392 | B2 * | 3/2013 | Tan | 379/93.02 |
| 8,548,139 | B2 * | 10/2013 | Dahl | 379/142.05 |
| 2004/0127218 | A1 * | 7/2004 | Paik et al. | 455/435.1 |
| 2007/0124760 | A1 * | 5/2007 | Novak et al. | 725/25 |
| 2008/0226047 | A1 * | 9/2008 | Reumann et al. | 379/142.04 |
| 2009/0083826 | A1 * | 3/2009 | Baribault | 726/1 |
| 2009/0136015 | A1 * | 5/2009 | Roberts | 379/210.02 |
| 2010/0087174 | A1 * | 4/2010 | Lu | 455/412.2 |
| 2010/0278320 | A1 * | 11/2010 | Arsenault et al. | 379/88.12 |
| 2013/0027504 | A1 * | 1/2013 | Zhang | 348/14.08 |
| 2013/0254391 | A1 * | 9/2013 | Srivastava et al. | 709/224 |

OTHER PUBLICATIONS

Video Captcha, http://www.youtube.com/watch?v=5iRIE7y1xVM, Retrieved Jul. 3, 2012, 2 pages.
Mobile Captcha Video Prototype, http://www.youtube.com/watch?v=GoWHLtQbufM&feature=related, Retrieve Jul. 3, 2012, 2 pages.
David Bushell, In Search of the Perfect Captcha, http://coding.smashingmagazine.com/2011/03/04/in-search-of-the-perfect-captcha/, Smashing Magazine, Published Mar. 4, 2011 in Captcha, Essentials, Techniques with 135 Comments, Retrieved Jul. 3, 2012, 21 pages.
Juraj Rolko, 3D Captcha Concept, http://www.3dcaptcha.net/, Retrieve Jul. 3, 2012, 4 pages.

* cited by examiner

*Primary Examiner* — Olisa Anwah
(74) *Attorney, Agent, or Firm* — Maldjian Law Group LLC; John Maldjian; Alexander D. Walter

(57) ABSTRACT

Authentication of a user initiating a communication may be achieved using a visual indicator of the user. Initiation of a communication may result in the initiator of the communication collecting image data associated with the initiator's identity. Additionally, the initiator may be required to perform a task, wherein a response to the task may be transmitted with the image data to the receiver of the communication. The receipt of the image data may allow a receiver of the communication to reduce spam and verify that the initiator is who it purports to be.

27 Claims, 4 Drawing Sheets

MITIGATING SPAM AND IDENTIFYING CALLERS IN VIDEO CALLS

BACKGROUND

1. Technical Field

Disclosed embodiments generally relate to mitigation of spam and identification of one or more initiators of a communication, and, in particular, to methods of using visual data to mitigate spam and identify the one or more initiators of a communication.

2. Description of Related Art

The use of IP telephony, including multimedia telephony, is experiencing a dramatic increase. Along with this increase in use, there is also a potential for an increase in misuse, including spam and caller ID falsification. Initiating communication is now as easy as clicking on a URL. Since there are few checks on who is initiating a communication, this ease of use can increase the frequency of spam. As such, users may be reluctant to adopt IP telephony as a legitimate means of communication.

Various telecommunications solutions attempt to mitigate spam and falsification by the use of an identifier such as caller ID or a Session Initiation Protocol ("SIP") identifier. These solutions identify a calling endpoint or a user logged into an endpoint and may be used to get additional information such as a name or a pre-programmed picture. Additionally, an identifier may be used to perform a service such as call blocking or displaying additional information.

Still other solutions attempt to address spam and falsification by having a caller speak their name when initiating communication. These solutions are inadequate in that they do not allow a receiver of the communication to identify the person making the call. Rather, the identity of the caller is tied to the calling device or to the user account logged into the calling device.

Therefore, a need exists to provide caller authentication, in order to provide verification that a caller is not falsifying their identity and not a spammer, and ultimately improved customer satisfaction.

BRIEF SUMMARY

Disclosed embodiments generally relate to mitigation of spam and identification of one or more initiators of a communication, and, in particular, to methods of using visual data to mitigate spam and identify the one or more initiators of a communication.

In one embodiment in accordance with the present invention, a method includes: receiving, in a memory, a first signal from a first telecommunications device, the first signal comprising a first request to communicate with a recipient telecommunications device; generating, using a processor, a first challenge request, wherein the first challenge request comprises information directing a user associated with the first telecommunications device to perform a first task; sending the first challenge request to the first telecommunications device; and receiving, from the first telecommunications device, a first challenge response responsive to the first challenge request, wherein the first challenge response comprises data responsive to the first task, and wherein at least a portion of the data responsive to the first task includes data that is presented for human interpretation.

In one embodiment in accordance with the present invention, a method includes: sending, using a processor, a signal to a first telecommunications device, wherein the signal is associated with a request to communicate; receiving, in a memory, a challenge request associated with the first telecommunications device, wherein the challenge request directs a user to perform a task, wherein the task includes instructions to identify the user of the first telecommunications device; presenting, using the processor, the challenge request to the user; collecting, using one or more input devices coupled to the processor, data responsive to the task associated challenge request; and sending the data to the first telecommunications device for authentication of the user.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

BRIEF DESCRIPTION OF THE DRAWINGS

The above and still further features and advantages of embodiments of the present invention will become apparent upon consideration of the following detailed description of embodiments thereof, especially when taken in conjunction with the accompanying drawings wherein like reference numerals in the various figures are utilized to designate like components, and wherein.

Figure 1:
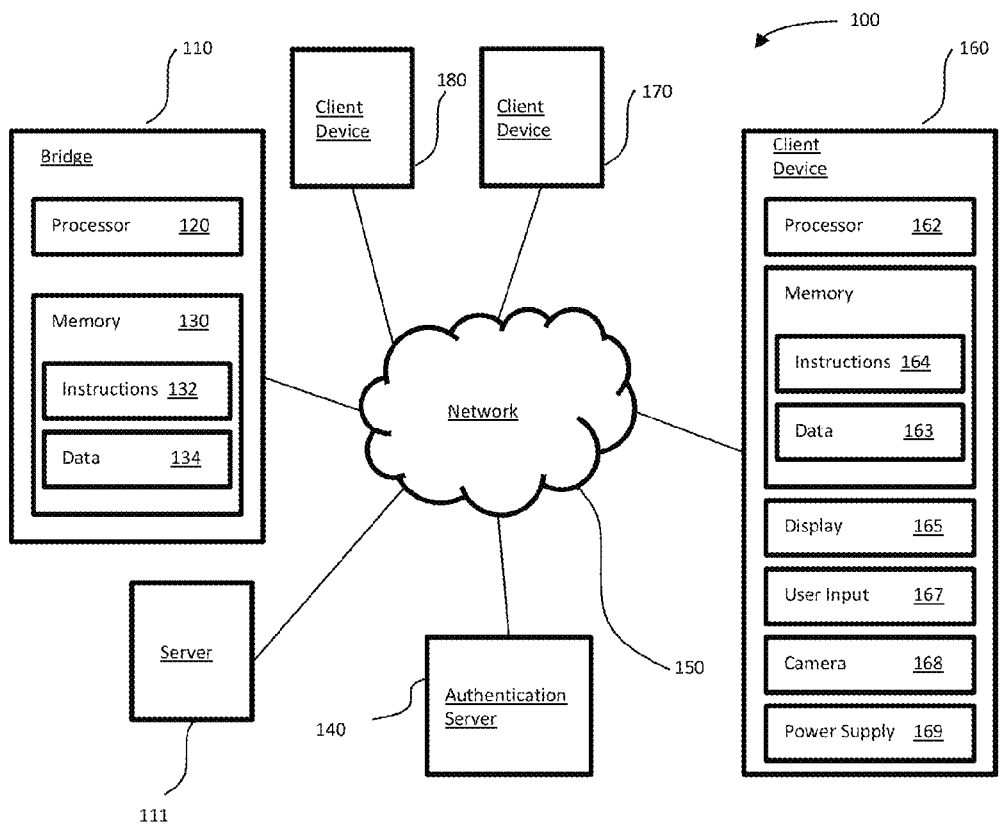
FIG. 1 is a functional diagram of a system according to one embodiment in accordance with the present invention.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures. Optional portions of the figures may be illustrated using dashed or dotted lines, unless the context of usage indicates otherwise.

DETAILED DESCRIPTION

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for exemplary purposes only and other examples may be employed in lieu of, or in combination with, the examples disclosed. It should also be noted the examples presented herein should not be construed as limiting of the scope of embodiments of the present invention, as other equally effective examples are possible and likely.

As used herein, the term "module" refers generally to a logical sequence or association of steps, processes or components. For example, a software module may comprise a set of associated routines or subroutines within a computer program. Alternatively, a module may comprise a substantially self-contained hardware device. A module may also comprise a logical set of processes irrespective of any software or hardware implementation.

Aspects of the disclosure relate generally to identifying an initiator of a communication over a telecommunications network. To identify an initiator, a communications device may collect image data from the initiator and transmit the data to an intended recipient of the communication. Additionally, a challenge, such as, for example, instructions to perform a task, may be transmitted to the initiator during communication setup. As a result, by verifying the image data and identifying that the challenge has been performed, the recipient of the communication may be able to verify that the initiator is not falsifying its identity and is not sending spam.

Figure 2:
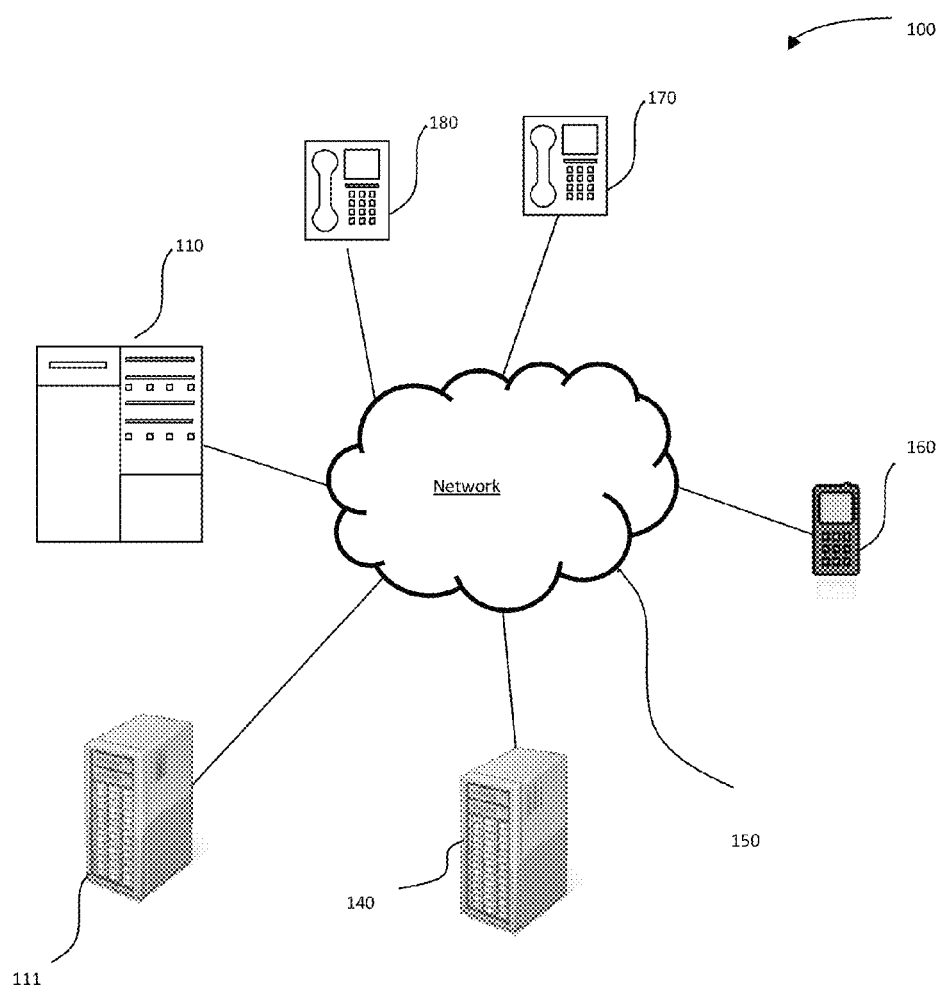
FIG. 2 is a pictorial diagram of the system of FIG. 1 in accordance with an embodiment of the present invention.

As shown in FIGS. 1-2, a system 100 in accordance with one aspect of the present technology includes telecommunications bridge 110 containing a processor 120, memory 130 and other components typically present in a communication device.

The bridge 110 may comprise one or more telecommunications devices that can provide video and/or audio services, such as, for example, a video server, a Private Branch Exchange (PBX), a switch, or a network server or any other device capable of bridging/mixing audio and/or video streams. Furthermore, bridge 110 may be at one node of a network 150 and may be capable of directly and indirectly receiving data from and sending data to other nodes of the network. For example, bridge 110 may be capable of receiving data from client device 160 via network 150 such that bridge 110 uses network 150 to transmit and display information to a user on display 165 of client device 170. Similarly, bridge 110 may, for example, comprise a web server that is capable of receiving data from a server 111 such that bridge 110 uses network 150 to transmit information to server 111.

Bridge 110 may also comprise a plurality of devices that exchange information with different nodes of a network for the purpose of receiving, processing and transmitting data to client devices. In this instance, the client devices will typically still be at different nodes of the network than any of the devices comprising bridge 110. Although bridge 110 is shown external to network 150, bridge 110 may be part of network 150.

The memory 130 stores information accessible by processor 120, including instructions 132, and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, solid-state drive, memory card, flash drive, ROM, RAM, DVD or other optical disks, as well as other write-capable and read-only memories. In that regard, memory may include short term or temporary storage as well as long term or persistent storage. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the architecture is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as any commercially available CPU. Alternatively, the processor may be a dedicated controller such as an ASIC. Although FIG. 1 functionally illustrates the processor and memory as being within the same block, it will be understood by those of ordinary skill in the art that the processor and memory may actually comprise multiple processors and memories that may or may not be stored within the same physical housing. For example, memory may be a hard drive or other storage media located in a server farm of a data center. Accordingly, references to a processor, a computer or a memory will be understood to include references to a collection of processors, computers or memories that may or may not operate in parallel.

System 100 may also include server 111. Server 111 may include hardware, software, or both and may be configured similarly to bridge 110, as described above. System 100 may also include authentication server 140. Server 140 may include hardware, software, or both and may be configured similarly to bridge 110, as described above. Although shown as a separate telecommunications device in FIGS. 1-2, in certain embodiments authentication server 140 may be integrated with bridge 110, server 111, and/or client devices 160 and 170.

Network 150 may be any telecommunications network such as, for example, the Internet, a Wide Area Network (WAN), a Local Area Network (LAN), the Public Switched Telephone Network (PSTN), WiFi, a cellular network, and an Integrated Digital Services Network (ISDN). Furthermore, network 150 may include one or more telecommunications networks with various configurations and may use various protocols such as, for example, VoIP, TCP/IP, proprietary protocols, instant messaging, HTTP and SMTP, and various combinations of the foregoing. Although only a few computers are depicted in FIGS. 1-2, it should be appreciated that a typical system can include a large number of connected computers.

Each client device 160 or 170 may be any type of telecommunications device that can output a video and/or audio stream, such as, for example, a telephone, a cellular telephone, a Personal Computer (PC), a Personal Digital Assistant (PDA), a monitor, a television, or a conference room video system. Furthermore, each client device may be configured similarly to bridge 110, as described above, and may include various components such as, for example, a central processing unit (CPU) 162, memory (e.g., RAM and internal hard drives) storing data 163 and instructions 164, an electronic display 165 (e.g., a monitor having a screen, a touchscreen, a projector, a television, a computer printer or any other electrical device that is operable to display information), output devices 166 (e.g., speaker, headset, headset connector), user input 167 (e.g., a mouse, keyboard, touch-screen or microphone), a camera 168, a battery power supply 169 or other power source, a network interface device, and all of the components used for connecting these elements to one another. Although shown as a single device, client devices 160 or 170 may be distributed between multiple devices. For example, client device 160 may be distributed between a telephone and a personal computer.

In addition to the operations described below and illustrated in the figures, various operations in accordance with aspects of the present technology will now be described. It should also be understood that the following operations do not have to be performed in the precise order described below. Rather, various steps can be handled in a different order or simultaneously. Steps may also be removed or added.

Figure 3:
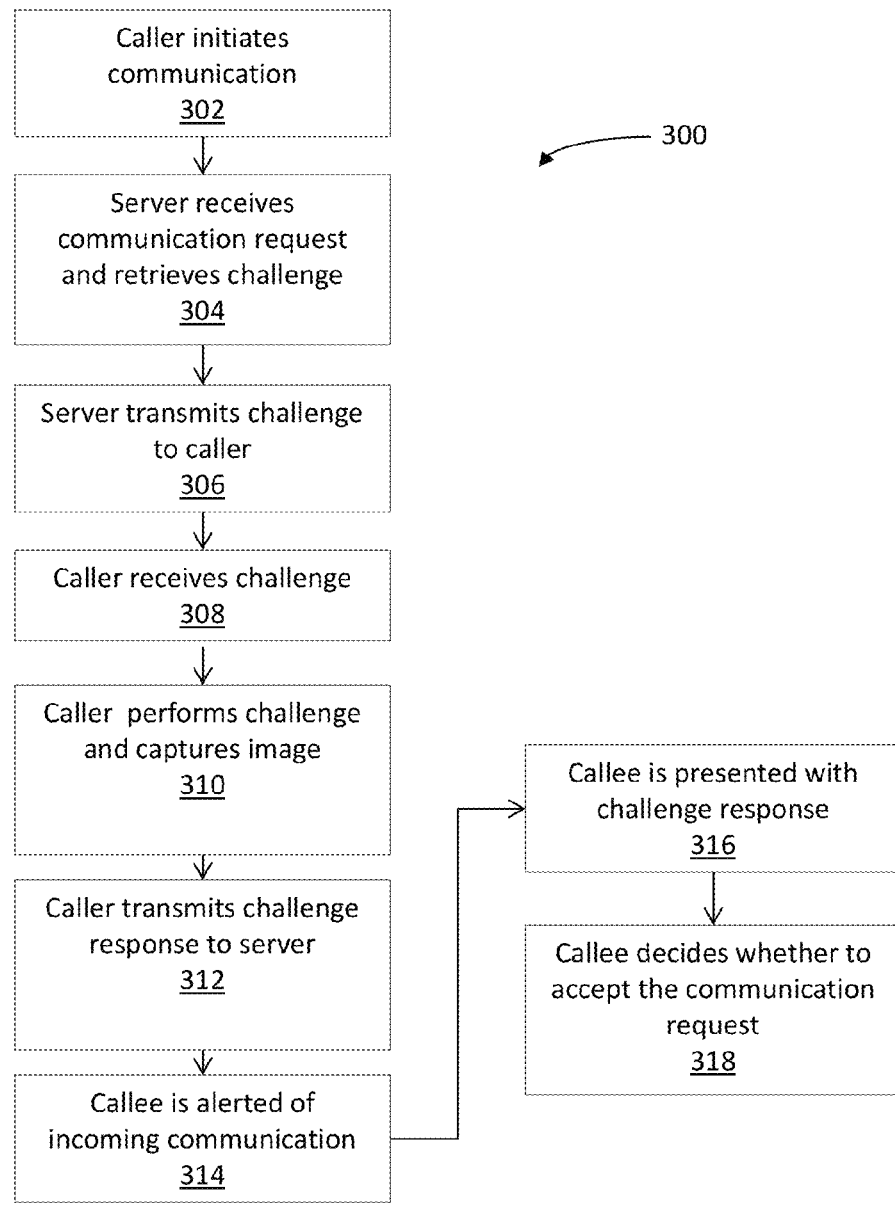
FIG. 3 is an exemplary flow diagram according to aspects of the present invention.

FIG. 3 is an exemplary process 300 for user authentication for an audio and/or video communication. At block 302, a client device 160 may request to initiate a communication to a recipient client device 170 through network 150. The communication may be initiated automatically or at the direction of a user (the "caller"). Additionally, the communication may be a direct connection with client device 170, an indirect connection via bridge 110, or an indirect connection via a plurality of intermediate servers or nodes.

At block 304, the communication request may be received by authentication server 140. In one embodiment, server 140 may retrieve and/or generate a challenge request that may direct the caller to perform some task. A task is one ore more particular visual gestures and/or audible responses that are required to be performed by a human after a request to initiate communication is received by authentication server 140. For example, a challenge request may direct the caller to cover his right eye, make a sign with his fingers, or touch his cheek. The challenge request may include any type of data that requires human interpretation such as, for example, text, audio, video, an image, a captcha, or any combination of these. In one embodiment, server 140 may query a database or select from a memory to retrieve a challenge request from a collection of challenges. In another embodiment, a user may direct the authentication server 140 to issue a specific challenge request.

In yet another embodiment, server 140 may determine whether the caller is on a safe list of pre-authorized callers. If the caller is on a safe list, server 140 may not retrieve and/or generate a challenge request, but may cause a connection to be established between client devices 160 and 170. For example, server 140 may use an address book associated with client device 170 to determine whether the phone number associated with client device 160 is pre-authorized. Thus, in accordance with this embodiment, server 140 would only retrieve and/or generate a challenge request for callers not on a safe list associated with client device 170.

In another embodiment, server 140 may determine the capabilities of client device 160 and retrieve and/or generate a challenge request accordingly. For example, if a device 160 does not have a display 165 or is incapable of capturing an image, the challenge request may be restricted to directing the caller to perform an audible task. An audible task may, for example, include saying the date and time of the call or remarking about a current news item.

At block 306, authentication server 140 may transmit the challenge request to client device 160 via network 150. At block 308, client device 160 may receive the challenge request and present the challenge request to a user. In one embodiment, client device 160 may display a message on display 165 directing the caller to perform a task. In another embodiment, client device 160 may play an audio and/or video message directing a user to perform the requested task. In yet another embodiment, client device 160 may use a variety of ways to direct a caller to perform a task.

In one embodiment, authentication of a caller by authentication server 140 may be policy driven. For example, authentication server 140 may apply a policy to determine whether to retrieve and transmit a challenge request to client device 160. A policy based on, for example, the type of device being used by the caller may require that a challenge request be retrieved and transmitted to the caller. Alternatively, a policy may not, for example, require the retrieval and transmission of a challenge request. By way of example only, a policy may be a single policy or a collection of policies and may be based on a number of factors, including whether a password or certificate is received, IP address of client device 160, the service provider of the communication, time of day, the type of communication, techniques used (e.g., cookie-based), status of the caller and/or intended recipient of the communication, urgency of the communication, or any combination of these or other policies. Further, a policy may randomly retrieve and transmit a challenge request to a caller. For example, if a particular recipient has been receiving a lot of spam communications, the policy may transmit a challenge request to some, most, or all callers. In this example, the choice of which callers will receive a challenge request may be random or selected by other methods.

At block 310, client device 160 may collect a challenge response to be used for authentication of the caller. This response may include, for example, image data using camera 167, audio data using a microphone, and/or text data. Furthermore, the challenge response may include data that is only interpretable by a human. In one embodiment, client device 160 may direct the caller to take one or more pictures of, for example, the caller's face. In another embodiment, client device 160 may automatically take one or more pictures of the caller—for example, after a certain amount of time to allow the caller to get ready for the picture. In yet another embodiment, the challenge response may be a video taken by client device 160 for a caller-defined or predetermined amount of time. In another embodiment, the challenge response may be an audio response captured by a microphone associated with client device 160. In yet another embodiment, the challenge response may include multiple pictures, videos, text, and/or audio responses. For example, in addition to comprising a picture taken by camera 167, the challenge response may also include a previously taken picture, a profile picture obtained from a search of social websites, or a link to one or more social websites.

In yet another embodiment, the challenge response may be collected while the caller performs the task directed by the challenge request. Verification that the task was performed may require a human to interpret the response. That is, the challenge response may include data that requires a human to determine whether the task has been performed. By way of example only, challenge data may be collected by camera 167 while the caller covers an eye, touches a cheek with a particular finger, hold up a certain number of fingers, and/or tilts its head, as directed by the received challenge request. In another embodiment, the challenge response may be an oral response that includes the caller speaking, for example, the date and time of the call or details about a current news event.

At block 312, client device 160 may transmit the challenge response over network 150 to authentication server 140 and/or client device 170. Additionally, data associated with client device 160 and/or caller such as, for example, the caller's name or phone number may also be sent to client device 170. The challenge response and any additional data (collectively, identification data) may be sent to client device 170 directly or via one or more intermediate nodes, such as, for example, bridge 110 and/or authentication server 140.

In one embodiment, as disclosed above, authentication of a caller by authentication server 140 may be policy driven. A policy may, for example, not require a caller to collect and transmit a challenge response. For example, a policy may allow known callers to connect with an intended recipient without requiring the caller to capture and transmit a challenge response. Furthermore, as discussed above, a policy may select certain callers to receive a challenge response based on certain factors.

At block 314, client device 170 may receive the incoming communication attempt and may alert a user of the client device 170 (the "callee") of the incoming communication. In one embodiment, client device 170 may alert the callee by emitting a sound such as a ring. In another embodiment, the callee may be presented with a prompt, vibration, warning, other visual, audible, or tactile notice, or a combination of any of these for an incoming communication attempt.

At block 316, client device 170 may present the callee with the challenge response transmitted by client device 160. In one embodiment, client device 170 may solicit input from the callee regarding whether the callee wants to be presented with the challenge response. If the callee chooses to be presented with the challenge response, client device 170 may present the challenge response via an output device, such as, for example, a display or speakers associated with device 170. In another embodiment, client device 170 may automatically present the challenge response to the callee when the callee is alerted of the incoming communication.

In addition to or in place of presenting the challenge response to a callee, authentication server 140 may use techniques to automatically authenticate a caller. For example, authentication server 140 may use facial recognition to determine whether the caller matches a known individual. Furthermore, authentication server may also use recognition techniques to determine whether the challenge response includes information related to the caller performing the task associated with the challenge request. As such, a callee may allow authentication server 140 to verify the caller or may use authentication server 140 as a second level of verification. Moreover, whether authentication server 140 automatically verifies a caller may be policy based, as discussed herein, or may be at the direction of a callee or other entity, such as an administrator.

At block 318, client device 170 may receive an authentication response via an input device associated with client device 170 from the callee regarding whether the callee wishes to communicate with the caller. If the callee chooses to communicate with the caller, the communication may proceed as an audio and/or video communication. As a result, a connection may be established between client devices 160 and 170. If the callee chooses to not communicate with the caller, the communication may terminate.

When client device 160 attempts to communicate with client device 170, similar techniques to those used in process 300 may be used to require mutual authentication to authenticate the callee to the caller. For example, when client device 160 initiates a communication, client device 160 and/or server 140 may generate and/or retrieve a challenge request and send it to client device 170. In another embodiment, the challenge request from client device 160 may be sent to client device 170 after client device 160 is authenticated. As such, client device 170 may be required to capture a challenge response and transmit that response to client device 160.

Process 300 may also be extended to a caller that registers for a service with video capabilities (e.g., Google Video). That is, when registering for an account for a service, the caller may be required to transmit a response to a challenge request from the service. This challenge response may be stored in the profile associated with the caller's service account. When the caller makes a call, the stored challenge response may be provided along with other data such as, for example, a current picture, a new challenge response and/or a profile picture from a social website. Furthermore, the process 300 may be extended to allow a callee to indicate to a service whether a caller is legitimate or not. For example, if a callee determines that a caller is a spammer, the callee may indicate that determination to the service. Thus, a caller may be forced re-authenticate to the service, respond to an increase in authentication challenges and/or cancel the account. Additionally, a trust indicator may be associated with the caller and may be transmitted to a callee with a challenge response. For example, a trust indicator may indicate a phone number, logged in user, or the amount of spam associated with the caller, account, or phone number.

Figure 4:
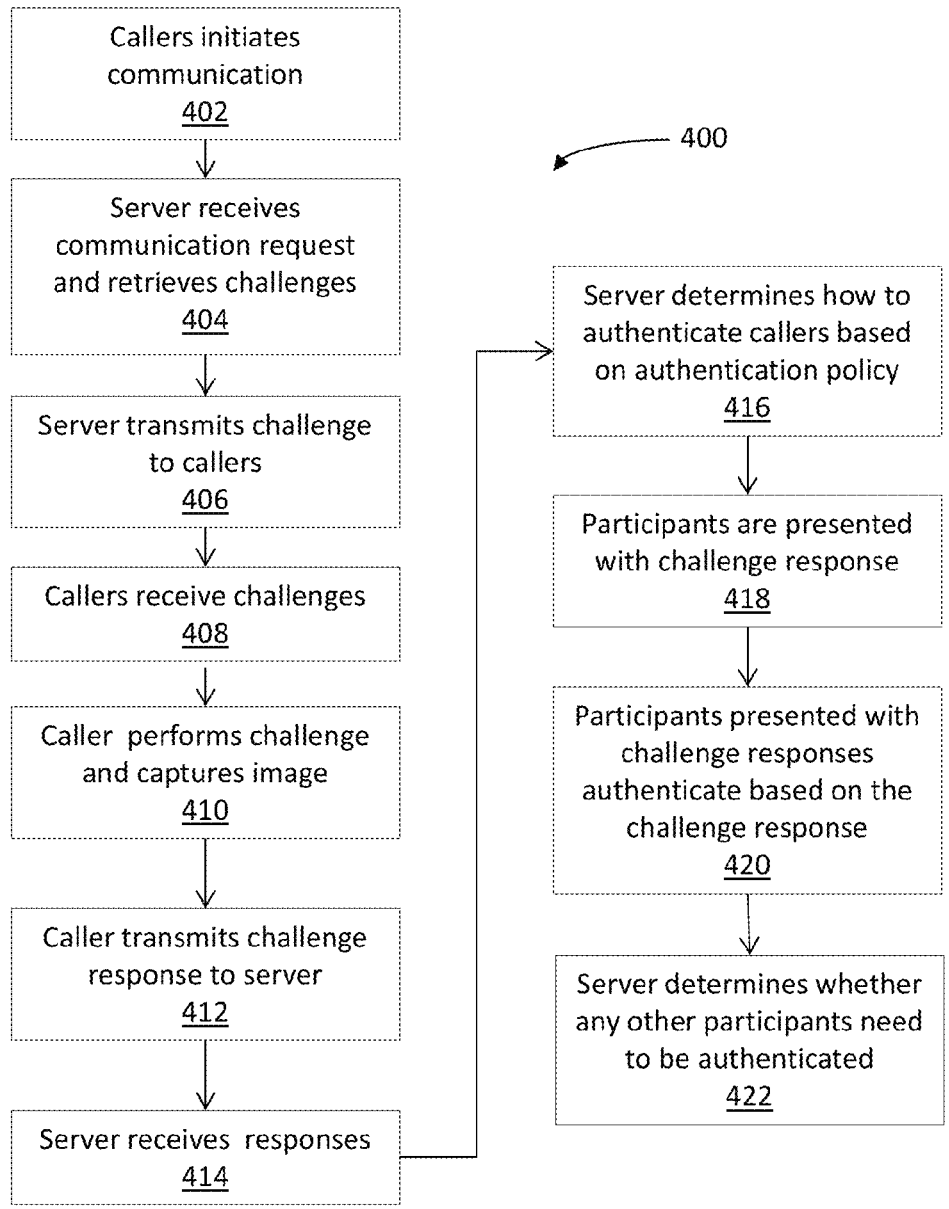
FIG. 4 is an exemplary flow diagram according to aspects of the present invention.

FIG. 4 is an exemplary process 400 for user authentication for an audio and/or video communication of a multi-party communication session. At block 402, one or more client devices 160, 170, and 180 may request to initiate a communication through network 150 to a recipient telecommunications device such as, for example, bridge 110. The communication may be initiated automatically or at the direction of a user. Additionally, the communication may be a direct connection with bridge 110 and/or authorization server 140, an indirect connection via another client device, or an indirect connection via a plurality of intermediate nodes.

At block 404, one or more of the communication requests may be received by authentication server 140. In one embodiment, server 140 may retrieve or generate a challenge request that may direct a caller to perform some task, as discussed herein. The challenge request may be different for some or all of the callers in the multi-party conference. In one embodiment, each of the client devices in the conference may be associated with the same challenge request. In another embodiment, each client device may be associated with a different challenge request. In yet another embodiment, a subset of client devices may be associated with a challenge request that differs from the challenge request associated with another subset of client devices. For example, client device 160 may be associated with one type of challenge request while client devices 170 and 180 may be associated with another type of challenge request.

At block 406, authentication server 140 may transmit the challenge request associated with client devices 160, 170 and 180 via network 150. At block 408, each client device 160, 170, and 180 may receive the associated challenge request and present the request to a user operating the device. The presentation of a challenge request may be presented to each user in a variety of ways, as discussed herein.

In one embodiment, authentication of a caller by authentication server 140 may be policy driven, as discussed herein. A multi-party communication may have an additional condition of authenticating all parties. For example, a particular client device 160 may have multiple users using the same device. In one embodiment, authentication server 140 may generate and/or retrieve a challenge request for each user of client device 160. In another embodiment, authentication server 140 may generate and/or retrieve a challenge request for a subset of users of client device 160. Furthermore, for each client device 160, 170, and 180, authentication server 140 may generate and/or retrieve a challenge request. In one embodiment, the challenge request may be the same for all devices. In another embodiment, a challenge request may be different for one or more of client device 160, 170, and 180. In yet another embodiment, a challenge request may be the same for one subset of users and different for another subset. For example, if one subset of client devices are incapable of taking a picture, that subset of devices may receive a challenge request that directs a user to respond via an audio task. Correspondingly, a subset of devices that are capable of taking a picture may receive a challenge request that directs a user to respond by taking a picture.

At block 410, each client device 160, 170, and 180 may collect a challenge response, as discussed herein. At block 412, each client device 160, 170, and 180 may transmit the challenge response over network 150 to authentication server 140 and/or another node on the network, as discussed herein.

In one embodiment, as discussed herein, authentication of a caller by authentication server 140 may be policy driven. For example, a policy may allow known callers to connect to a multi-party conference without requiring the caller to capture and transmit a challenge response. Furthermore, as discussed above, a policy may select certain callers to capture a challenge response based on certain factors.

At block 414, authentication server 140 and/or bridge 110 may receive the incoming communication attempt. A multi-party telecommunication may differ from a client-to-client telecommunication in that different participants in the multi-party telecommunication may have differing relationships with one another. For example, a user of a client device 160 may know a user of a client device 170 but may not know a user of a client device 180. The user of client device 170, however, may know the user of client device 180. Additionally, a multi-party telecommunication may, for example, include some participants that were invited to the conference while other participants were not invited. Therefore, for these and other situations, it may be necessary to have different levels of authentication for different participants.

At block 416, authentication server 140 may use an authentication policy to determine how to authenticate particular callers. For example, in one embodiment an authentication policy may require challenge response associated with individuals that were not invited to a multi-party conference to be authenticated by all invited participants, while allowing invited participants to communicate without verification of an associated challenge response. In another embodiment, all challenge responses associated with all uninvited participants may be authenticated by a subset of all participants or by an administrator. In yet another embodiment, an authentication policy may identify relationships between participants and allow verification of certain participants based on those relationships. In another embodiment, a policy may be based on a number of factors, including whether a password or certificate is received, IP address of client devices, the service providers of the devices, time of day, the type of communication, techniques used (e.g., cookie-based), status of the participants and/or the conference, urgency of the communication, or any combination of these or other policies. In another embodiment, one or more challenge responses may be verified for some or all participants at a later point in time after the conference begins. In yet another embodiment, authentication server 140 may use techniques to automatically authenticate a caller, as discussed herein, as the only or second level of authentication.

At block 418, one or more challenge responses may be presented to one or more participants via their associated client device, as discussed herein, based on an associated authentication policy. At block 420, authenticating client devices that present the one or more challenge responses may receive input from its associated user regarding whether to authenticate a participant associated with a particular challenge response, as discussed herein. If the participant associated with a particular response is authenticated, that participant may continue on the conference. Conversely, if the participant associated with the response is not authenticated, the participant may be disconnected from the conference.

At block 422, authentication server 140 may require certain callers to be authenticated after commencement of the multi-party conference. In one embodiment, this requirement may be based on an authentication policy. For example, if a participant begins speaking during the conference, the authentication server 140 may require that speaking participant to be authenticated. Furthermore, a challenge request may be retrieved and/or generated and a challenge response may be collected and transmitted after the participant begins speaking. Alternatively, the challenge request may have been generated and a challenge response collected at a prior time (e.g., blocks 404-410 of process 400). If the speaking participant is authenticated, the speaking participant may continue on the conference. Conversely, if the speaking participant is not authenticated, the speaking participant may be disconnected from the conference.

In another embodiment, a participant may be authenticated based on another participant requesting verification. For example, once a participant begins speaking, a listening participant may not recognize the voice of the speaking participant. As a result, the listening participant may request that the participant be authenticated by either a third participant, by the listening participant, or by another party or node. Furthermore, a challenge request may be retrieved and/or generated and a challenge response may be collected and transmitted after the listening participant requests verification. Alternatively, the challenge request may have been generated and a challenge response collected at a prior time (e.g., blocks 404-410 of process 400). If the speaking participant is authenticated, the speaking participant may continue on the conference. Conversely, if the speaking participant is not authenticated, the speaking participant may be disconnected from the conference.

One advantage of the disclosure is to allow authentication of a caller of a telecommunication by giving one or more other participants of the telecommunication an opportunity to visually verify the caller by, for example, seeing a picture of the caller taken after initiation of the telecommunication. Additionally, by supplying a challenge request, a participant may verify that a caller is not a spammer by verifying that the caller performs the task associated with the challenge request.

As these and other variations and combinations of the features discussed above can be utilized without departing from the disclosure as defined by the claims, the foregoing description of exemplary embodiments should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects.

Embodiments of the present invention include a system having one or more processing units coupled to one or more memories. The one or more memories may be configured to store software that, when executed by the one or more processing unit, allows one or more callers to be authenticated by responding to a challenge request, at least by use of processes described herein, including at least in FIGS. 3 and 4, and related text.

The disclosed methods may be readily implemented in software, such as by using object or object-oriented software development environments that provide portable source code that can be used on a variety of computer or workstation platforms. Alternatively, the disclosed system may be implemented partially or fully in hardware, such as by using standard logic circuits or VLSI design. Whether software or hardware may be used to implement the systems in accordance with various embodiments of the present invention may be dependent on various considerations, such as the speed or efficiency requirements of the system, the particular function, and the particular software or hardware systems being utilized.

Moreover, the claims should not be read as limited to the described order or elements unless stated to that effect. In addition, use of the term "means" in any claim is intended to invoke 35 U.S.C. §112, ¶6, and any claim without the word "means" is not so intended.

The invention claimed is:

1. A method, comprising:
receiving, in a memory, a first signal from a first telecommunications device, the first signal comprising a first request to communicate with a recipient telecommunications device;
generating, using a processor, a first challenge request, wherein the first challenge request comprises information directing a user associated with the first telecommunications device to perform a first task, wherein the first challenge request directs the user to perform a movement;
sending the first challenge request to the first telecommunications device; and
receiving, from the first telecommunications device, a first challenge response responsive to the first challenge request, wherein the first challenge response comprises data responsive to the first task, and wherein at least a portion of the data responsive to the first task includes data that is presented for human interpretation.

2. The method of claim 1 wherein the first task directs the user to perform a gesture.

3. The method of claim 1 wherein the first challenge response comprises a photo.

4. The method of claim 1 wherein the first challenge response comprises a video.

5. The method of claim 1 wherein the first challenge response comprises audio only.

6. The method of claim 1 wherein the first challenge response comprises one or more images of the user performing the first task associated with the first challenge request.

7. The method of claim 1, further comprising:
presenting, using the processor and an output device coupled to the processor, the data responsive to the first task to a recipient user;
receiving an authentication response from the recipient user, wherein the authentication response indicates whether the first user is authenticated; and
establishing, using the processor, a connection with the first telecommunications device based on the authentication response.

8. The method of claim 7, further comprising:
receiving a trust indicator associated with the user of the first telecommunications device; and
presenting, using the processor and the output device, the trust indicator to the recipient user.

9. The method claim 7, further comprising:
sending, to a third telecommunications device, an indication associated with the user associated with the first telecommunications device, wherein the indication includes information indicating legitimacy of the user.

10. The method of claim 1, further comprising:
sending the first challenge response to the recipient telecommunications device to authenticate the user associated with the first telecommunications device; and
establishing a first connection wherein the first telecommunications device communicates with the recipient telecommunications device.

11. The method of claim 10, further comprising:
receiving, in the memory, a second signal from a second telecommunications devices, the second signal comprising a second request to communicate with the recipient telecommunications device;
generating, using the processor, a second challenge request, wherein the second challenge request comprises information directing a user associated with the second telecommunications device to perform a second task;
sending the second challenge request to the second telecommunications device;
receiving, from the second telecommunications device, a second challenge response responsive to the second challenge request, wherein the second challenge response comprises data responsive to the second task; and
sending the second challenge response to one or more authenticating telecommunications devices to authenticate the user associated with the second telecommunications device.

12. The method of claim 11, further comprising:
establishing, using the processor, a second connection with the second telecommunications device based on an authentication policy.

13. The method of claim 11 wherein the second task is the same as the first task.

14. The method of claim 11 wherein the second task is different from the first task.

15. A method, comprising:
sending, using a processor, a signal to a first telecommunications device, wherein the signal is associated with a request to communicate;
receiving, in a memory, a challenge request associated with the first telecommunications device, wherein the challenge request directs a user to perform a task, wherein the task includes instructions to identify the user of the first telecommunications device;
presenting, using the processor, the challenge request to the user;
collecting, using one or more input devices coupled to the processor, data responsive to the task associated challenge request; and
sending the data to the first telecommunications device for authentication of the user, wherein the data comprises a member of a group consisting of a photo, a video and one or more images of the user performing the task associated with the challenge request.

16. The method of claim 15 wherein the task directs the user to perform a gesture.

17. A method, comprising:
receiving, in a memory, a first signal from a first telecommunications device, the first signal comprising a first request to communicate with a recipient telecommunications device;
generating, using a processor, a first challenge request, wherein the first challenge request comprises information directing a user associated with the first telecommunications device to perform a first task;
sending the first challenge request to the first telecommunications device; and
receiving, from the first telecommunications device, a first challenge response responsive to the first challenge request, wherein the first challenge response comprises data responsive to the first task, and wherein at least a portion of the data responsive to the first task includes data that is presented for human interpretation, wherein the first challenge response further comprises a response selected from a group consisting of a photo, a video and one or more images of the user performing the first task associated with the first challenge request.

18. The method of claim 17 wherein the first task directs the user to perform a gesture.

19. The method of claim 17 wherein the first challenge request directs the user to perform a movement.

20. The method of claim 17, further comprising:
presenting, using the processor and an output device coupled to the processor, the data responsive to the first task to a recipient user;
receiving an authentication response from the recipient user, wherein the authentication response indicates whether the first user is authenticated; and
establishing, using the processor, a connection with the first telecommunications device based on the authentication response.

21. The method of claim 20, further comprising:
receiving a trust indicator associated with the user of the first telecommunications device; and
presenting, using the processor and the output device, the trust indicator to the recipient user.

22. The method claim 20, further comprising:
sending, to a third telecommunications device, an indication associated with the user associated with the first telecommunications device, wherein the indication includes information indicating legitimacy of the user.

23. The method of claim 17, further comprising:
sending the first challenge response to the recipient telecommunications device to authenticate the user associated with the first telecommunications device; and
establishing a first connection wherein the first telecommunications device communicates with the recipient telecommunications device.

24. The method of claim 23, further comprising:
receiving, in the memory, a second signal from a second telecommunications devices, the second signal comprising a second request to communicate with the recipient telecommunications device;
generating, using the processor, a second challenge request, wherein the second challenge request comprises information directing a user associated with the second telecommunications device to perform a second task;
sending the second challenge request to the second telecommunications device;
receiving, from the second telecommunications device, a second challenge response responsive to the second challenge request, wherein the second challenge response comprises data responsive to the second task; and
sending the second challenge response to one or more authenticating telecommunications devices to authenticate the user associated with the second telecommunications device.

25. The method of claim 24, further comprising:
establishing, using the processor, a second connection with the second telecommunications device based on an authentication policy.

26. The method of claim 24 wherein the second task is the same as the first task.

27. The method of claim 24 wherein the second task is different from the first task.

* * * * *